US011161426B2

(12) United States Patent
Park et al.

(10) Patent No.: US 11,161,426 B2
(45) Date of Patent: Nov. 2, 2021

(54) SYSTEM AND METHOD FOR INSPECTING WIRELESS CHARGING OF ELECTRIC VEHICLE

(71) Applicants: HYUNDAI MOTOR COMPANY, Seoul (KR); KIA MOTORS CORPORATION, Seoul (KR)

(72) Inventors: Jun Yeon Park, Uiwang-si (KR); Haeseong Lee, Anyang-si (KR); Jihoon Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 205 days.

(21) Appl. No.: 16/676,378

(22) Filed: Nov. 6, 2019

(65) Prior Publication Data

US 2020/0139843 A1    May 7, 2020

(30) Foreign Application Priority Data

Nov. 7, 2018 (KR) ........................ 10-2018-0136112

(51) Int. Cl.
*B60L 53/66* (2019.01)
*H02J 7/02* (2016.01)
(Continued)

(52) U.S. Cl.
CPC .............. *B60L 53/66* (2019.02); *B60L 53/36* (2019.02); *B60L 53/62* (2019.02); *B60L 53/65* (2019.02); *H02J 7/025* (2013.01)

(58) Field of Classification Search
CPC .......... B60L 53/36; B60L 53/37; B60L 53/38; B60L 53/12; B60L 53/39; B60L 53/62;
(Continued)

(56) References Cited

U.S. PATENT DOCUMENTS

| 2013/0193918 A1* | 8/2013 | Sarkar | B60L 5/36 |
| | | | 320/109 |
| 2014/0021912 A1* | 1/2014 | Martin | B60L 53/126 |
| | | | 320/109 |
| 2015/0015201 A1* | 1/2015 | Kim | B60L 53/66 |
| | | | 320/109 |

FOREIGN PATENT DOCUMENTS

| EP | 2 720 342 A1 | 4/2014 |
| JP | 5720780 B2 | 5/2015 |

(Continued)

*Primary Examiner* — Paul Dinh
(74) *Attorney, Agent, or Firm* — Morgan, Lewis & Bockius LLP

(57) ABSTRACT

A system for inspecting wireless charging of an electric vehicle includes: a wireless charger configured to transmit electric power through a transmission pad disposed on an inspection reference line of a rail; a centering unit configured to align a position of a reception pad on a vertical position of the transmission pad through a driving roller on which the electric vehicle is positioned; and an inspector configured to connect a wireless diagnosing communication, wirelessly charge a high voltage battery, and integrally inspect operation status of at least one of a battery management system (BMS), a battery cooling system, a battery charging system, or a high voltage distribution system during the wireless charging of the high voltage battery by receiving a test information from an electric power control unit (EPCU) of the electric vehicle connected through the wireless diagnosing communication.

20 Claims, 6 Drawing Sheets

(51) Int. Cl.
*B60L 53/36* (2019.01)
*B60L 53/62* (2019.01)
*B60L 53/65* (2019.01)

(58) Field of Classification Search
CPC ........ B60L 53/65; B60L 53/66; B60L 53/126; B60L 53/665; B60L 58/12; B60L 58/26; B60L 2240/545; B60L 2240/547; B60L 2250/10; Y02T 90/12; Y02T 90/14; Y02T 90/16; Y02T 10/70; Y02T 10/7072; H02J 7/025; H02J 50/90; H02J 50/12; B60Y 2200/91; B60Y 2400/302; B60Y 2400/89
USPC ....................................................... 320/109
See application file for complete search history.

(56) References Cited

FOREIGN PATENT DOCUMENTS

| | | |
|---|---|---|
| KR | 10-2016-0025200 A | 3/2016 |
| KR | 10-2016-0069884 A | 6/2016 |
| KR | 10-2017-0106008 A | 9/2017 |
| KR | 10-1803151 B1 | 11/2017 |
| KR | 10-2017-0142046 A | 12/2017 |
| KR | 10-2018-0019950 A | 2/2018 |

\* cited by examiner

-PRIOR ART-

FIG. 6

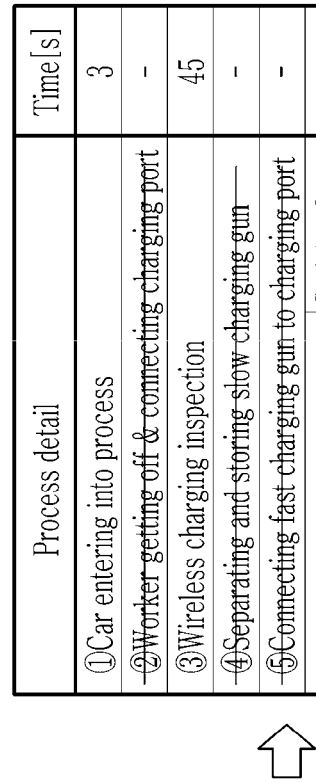

| Process detail | Time[s] |
|---|---|
| ①Car entering | 3 |
| ②Worker getting off & connecting charging port | 15 |
| ③Slow charging inspection | 45 |
| ④Separating and storing slow charging gun | 4 |
| ⑤Connecting fast charging gun to charging port | 6 |
| ⑥Fast charging inspection CHAdeMO type | 40 |
| Combo type | 56 |
| ⑦Separating and storing fast charging gun | 6 |
| ⑧Worker riding on vehicle and moving | 7 |
| Total | 131 |

<Conventional charging inspection>

| Process detail | Time[s] |
|---|---|
| ①Car entering into process | 3 |
| ②Worker getting off & connecting charging port | - |
| ③Wireless charging inspection | 45 |
| ④Separating and storing slow charging gun | - |
| ⑤Connecting fast charging gun to charging port | - |
| ⑥Fast charging inspection CHAdeMO type | - |
| Combo type | - |
| ⑦Separating and storing fast charging gun | - |
| ⑧Vehicle leaving | 3 |
| Total | 51 |

<Wireless charging inspection of present invention>

SYSTEM AND METHOD FOR INSPECTING WIRELESS CHARGING OF ELECTRIC VEHICLE

CROSS-REFERENCE TO RELATED APPLICATION

This application claims priority to and the benefit of Korean Patent Application No. 10-2018-0136112 filed in the Korean Intellectual Property Office on Nov. 7, 2018, the entire contents of which are incorporated herein by reference.

TECHNICAL FIELD

The present disclosure relates to a system and method for inspecting wireless charging of an electric vehicle, more particularly, to a system and method for inspecting wireless charging of an electric vehicle configured to inspect charging performance of a high voltage battery installed in the electric vehicle which is being manufactured in factory.

BACKGROUND

Generally, an electric vehicle (EV) means a vehicle driven by a power of motor utilizing electrical energy. In the electric vehicle, high voltage battery is installed to store the electric energy. FIG. 1 illustrates a state performing a charging inspection in charging inspection process in factory according to the related art. Referring to FIG. 1, in a conventional charging inspection system in factory, a high voltage system charging assembly, charging coupler, charging cable, and managing PC are equipped. When the electric vehicle is transferred to the inspection process, the worker connects the charging coupler and the electric vehicle wired through the charging cable, and performs a failure test and the charging performance test of the high voltage battery while charging it. However, inspection methods for conventional electric vehicle charging systems utilizing charging couplers such as DC combo, CHAdeMO, AC 3-phase, Supercharger, or 9 pin may have coupler compatibility problems. Further problems such as interference on operation, or influence on charging or communication may also occur. Particularly, there is a disadvantage that extra work process and operation hour are excessively generated for the wired inspection. For example, referring to FIG. 6, a conventional inspection method for charging electric vehicle may include following steps: ① vehicle entering; ② worker's getting off from the vehicle & connecting charging port (15 seconds); ③ inspecting slow charging function (45 seconds); ④ separating and storing slow charging gun (4 seconds); ⑤ connecting fast charging gun to the charging port (6 seconds); ⑥ inspecting fast charging function (40 seconds for CHAdeMO type, and 56 seconds for Combo type); ⑦ separating and storing fast charging gun 6 seconds); and ⑧ the worker's riding on the vehicle and moving out (7 seconds), and the total operation time may be around 131 seconds. Given that the maximum time for process per vehicle is 60 seconds, there is a problem that the charging inspection time is excessively required.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a system and method for inspecting wireless charging of electric vehicle capable of aligning transmission/reception pads for wireless charging of a high voltage battery according to vehicle type of electric vehicle, collecting test information regarding the wireless charging through a wireless diagnostic charging, and inspecting a performance of the wireless charging.

A system for inspecting wireless charging of an electric vehicle according to according to an exemplary embodiment of the present disclosure may include: a wireless charger configured to transmit electric power for a wireless charging of a high voltage battery through a transmission pad disposed on an inspection reference line of a rail; a centering unit configured to align a position of a reception pad on a vertical position of the transmission pad through a driving roller on which the electric vehicle is positioned; and an inspector configured to connect a wireless diagnostic communication through a wireless terminal and an antenna of the electric vehicle, wirelessly charge the high voltage battery by supplying the electric power through the wireless charger, and integrally inspect operation status of at least one of a battery management system (BMS), a battery cooling system, a battery charging system, or a high voltage distribution system during the wireless charging of the high voltage battery by receiving test information from an electric power control unit (EPCU) of the electric vehicle connected through the wireless diagnostic communication.

The wireless charger may include a converter configured to rectify a power source supplied from a common AC power grid, a DC-AC inverter, a filter, and a resonant circuit, and may be configured to transmit the electric power in a wireless power transmission method through the transmission pad.

When tires are seated on the driving roller, the centering unit may be configured to grasp an alignment status of the transmission pad and the reception pad by calculating a rotation center and a rotation angle of the electric vehicle through a top view image photographed by a vision sensor on the upper side.

When the transmission pad and the reception pad are not aligned correctly, the centering unit may be configured to align the electric vehicle to the inspection reference line by operating the driving rollers back and forth.

The system may further include: a transmission pad alignment unit configured to couple a rod of an actuator to one surface of the transmission pad and move it back and forth along a rail of a direction of the inspection reference line.

The inspector may include a wireless communication unit configured to perform the wireless diagnostic communication with the wireless terminal of the electric vehicle; a wired communication unit comprising an Ethernet communication line and at least one signal line for a communication with external apparatus; a position alignment inspection unit configured to grasp an alignment status of the transmission pad and the reception pad by a plane image photographed by a vision sensor on the upper side of the centering unit; a BMS inspection unit configured to inspect the operation status of the BMS based on the test information received through the wireless diagnostic communication; a battery cooling inspection unit configured to inspect the operation status of the battery cooling system based on the test information received through the wireless diagnostic communication; a battery charging inspection unit configured to inspect the activation status of the EPCU and the wireless charging status of the high voltage battery based on the test information received through the wireless diagnostic communication; a battery distribution inspection unit configured to inspect whether a high voltage distribution is normal, by checking electric power distribution control test information of a high voltage junction box; a database configured to store various data, programs and inspecting algorithm for the wireless charging inspection; and a controller configured to control an overall operation of the each unit and the wireless inspecting system according to the inspection algorithm.

The position alignment inspection unit may be configured to grasp a position of the reception pad according to a vehicle type information, and operate the transmission pad alignment unit to move the transmission pad to a vertical position of the reception pad when the transmission pad and the reception pad are not aligned correctly, The BMS inspection unit may be configured to determine whether predetermined conditions are satisfied and the BMS is operating normally by performing a battery state of charge (SOC) inspection, a battery output inspection, a power relay inspection, a cooling inspection and a malfunction diagnostic inspection based on the test information during the wireless charging.

The battery cooling inspection unit may be configured to determine whether the battery cooling system is operating normally according to a cooling fan control performance and a temperature maintenance condition based on battery cooling test information according to a cooling fan control status detector and a battery temperature detector.

The battery cooling inspection unit may be configured to determine whether a cooling fan control performance is normal by performing an operation test controlling a speed of a cooling fan in nine steps through the EPCU.

The database may be configured to store information regarding a mounting position of the reception pad from design information according to each type of electric vehicle, and match and store a OBD ID of the wireless terminal of the electric vehicle and a vehicle identification information.

When an alignment status of the transmission pad and the reception pad meets a position alignment tolerance range, the controller may be configured to operate the wireless charger to wirelessly charge the high voltage battery.

When all the results of the inspections on the BMS inspection unit, the battery cooling inspection unit, the battery charging inspection unit and the battery distribution inspection unit are determined to be normal, the controller may determine the wireless charging performance of the electric vehicle to be normal and terminates the wireless charging inspection.

A method for inspecting wireless charging of an electric vehicle using a system for inspecting inspect a performance of a high voltage battery according to an exemplary embodiment of the present disclosure may include: a) connecting a wireless diagnostic communication with a wireless terminal which is disposed in an electric vehicle; b) inspecting, when tires are positioned on a driving roller of a centering unit, an alignment status of a transmission pad and a reception pad for wireless charging by a plane image photographed by a vision sensor on an upper side of the centering unit; c) wirelessly charging the high voltage battery by supplying electric power when the alignment status of the transmission pad and the reception pad is normal, and receiving test information according to wireless charging from an in-vehicle electric power control unit (EPCU) which is connected through the wireless diagnostic communication; and d) integrally inspecting operation status of at least one of a battery management system (BMS), a battery cooling system, a battery charging system, or a high voltage distribution system during wireless charging of the high voltage battery.

Step a) may include inquiring an OBD ID of a wireless terminal and vehicle type information matched with the input VIN of the electric vehicle 10.

Step b) may include detecting a tilted angle of the reception pad compared to the transmission pad by calculating a rotation center and a rotation angle of the electric vehicle; and performing, when the tilted angle does not meet a position alignment tolerance range, a position alignment operation by operating the driving roller back and forth.

Step b) may include grasping a position of the reception pad according to the vehicle type information of the electric vehicle; operating, when the current position of the transmission pad is determined to be mismatched with the reception pad a transmission pad alignment unit to move the transmission pad to a vertical position of the reception pad.

Step d) may include d-1) determining whether predetermined normal operation conditions for a battery state of charge (SOC) inspection, a battery output inspection, a power relay inspection, a cooling inspection and a malfunction diagnostic inspection based on the test information during the wireless charging are satisfied based on the test information; d-2) determining whether predetermined normal operation condition for cooling fan control performance and a predetermined temperature maintenance condition is satisfied based on a battery cooling test information according to a cooling fan control status detector and a battery temperature detector, d-3) determining whether the EPCU is activated and the wireless charging is operated normally based on the test information; and d-4) determining whether a high voltage electric power distribution is operated normally by checking an electric power distribution control test information.

After step d), the method may further include determining, when all the results of the inspections included in from step d-1) to step d-4) are determined to be normal, the performance of wireless charging of the electric vehicle to be normal; and terminating the wireless charging inspection.

Step d) may include determining, when any one of the results of the inspections included in from step d-1) to step d-4) are determined to be abnormal, the wireless charging inspection to be failed; and storing an inspection failure log into a database and displaying or alarming it to the worker.

According to an exemplary embodiment of the present disclosure, a wireless charging inspection system may be built-up in a conventional process line for performing a wireless charging performance inspection automatically without worker's intervention. In this regard, work process and operation hour may be reduced, and cost may be reduced accordingly Further, by aligning transmission/reception pads for wireless charging of a high voltage battery according to vehicle type of the electric vehicle, the system may adapt to various types of vehicles in one process line, without building-up extra process facilities. Moreover, by establishing a systematic inspection system for high voltage battery system, which is a key component of electric vehicles, it is possible to improve the quality of electric vehicles and preemptively respond to prior production technologies.

BRIEF DESCRIPTION OF THE DRAWINGS

FIG. 6 illustrates a comparison of operation times of a method for inspecting wireless charging of electric vehicle according to the related art and an exemplary embodiment of the present disclosure.

DETAILED DESCRIPTION OF THE EMBODIMENTS

Figure 1:
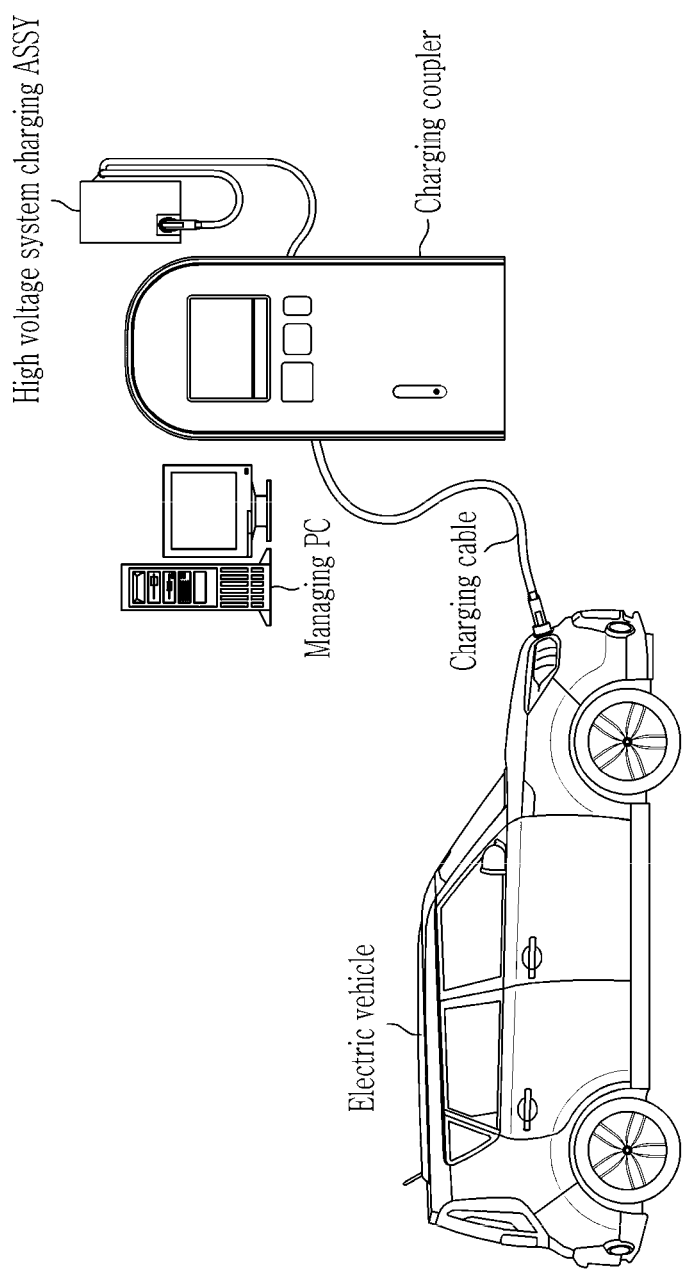
FIG. 1 shows a state performing a charging inspection in charging inspection process in factory according to the related art.
Figure 2:
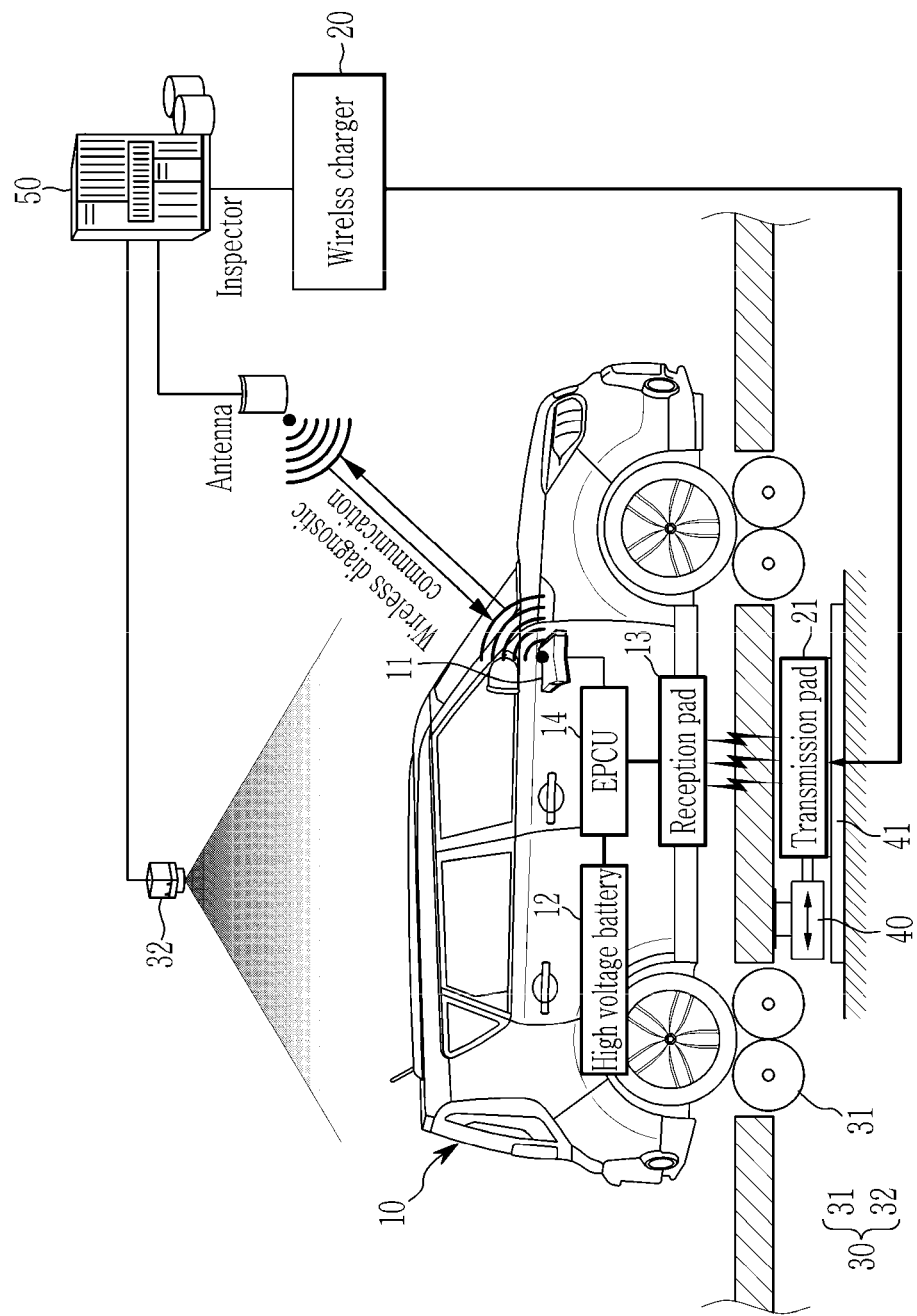
FIG. 2 illustrates a configuration of a system for inspecting wireless charging of electric vehicle according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification. Throughout the specification, unless explicitly described to the contrary, the word "comprise" and variations such as "comprises" or "comprising" will be understood to imply the inclusion of stated elements but not the exclusion of any other elements. In addition, the terms "-er," "-or" and "module" described in the specification mean units for processing at least one function and operation and can be implemented by hardware components or software components and combinations thereof. Now, a system and method for inspecting wireless charging of electric vehicle according to an exemplary embodiment of the present disclosure will be described in detail with reference to the drawings. FIG. 2 illustrates a configuration of a system for inspecting wireless charging of electric vehicle according to an exemplary embodiment of the present disclosure.

Referring to FIG. 2, a system for inspecting wireless charging of electric vehicle includes an electric vehicle 10, a wireless charger 20, a centering unit 30, a transmission pad alignment unit 40 and an inspector 50. The electric vehicle 10 is assembled while moving along a process line, and includes a wireless terminal 11, a high voltage battery 12, a reception pad 13 and an Electric Power Control Unit (EPCU) 14. The electric vehicle enters into a wireless charging inspecting process for inspection of charging performance of the high voltage battery 12. The electric vehicle 10 may not be limited to simple electric vehicle (EV) driven only by a motor driven with electric power of a battery, but may include hybrid electric vehicle or plugin hybrid electric vehicle. Throughout the specification, 'vehicle' may mean an electric vehicle unless otherwise noted.

The wireless terminal 11 is configured as wireless On-Board Diagnostics (OBD), and connects wireless diagnostic communication with the inspector 50 through a relay antenna. The high voltage battery 12 stores a high voltage electric power for driving a motor (not shown) of the electric vehicle 10. The reception pad 13 is aligned at a vertical position of a transmission pad 21, and receives an electric power wirelessly transmitted from the transmission pad 21. The reception pad 13 is a vehicle assembly (VA) configured to support wireless charging function, and may include a receiving coil for receiving wirelessly transmitted electric power, a resonant circuit and a filter for frequency matching, and a rectifier.

The EPCU 14 is an integrated power controller configured to control a charging and discharging of the electric vehicle 10. More particularly, the EPCU 14 controls the charging of the electric vehicle 10 by supplying the electric power received through the reception pad 13, to the high voltage battery 12. The EPCU 14 may include a low voltage DC-DC converter (LDC), a motor control unit (MCU), a vehicle control unit (VCU), an on-board charger (OBC), and the like. The EPCU 14 is interlocked with the inspector 50 for wireless charging inspection of the electric vehicle 10, collect test information from various controllers or sensors in the electric vehicle 10 during wireless charging of the high voltage battery 12, and transfer the collected test information to the inspector 50 for a wireless diagnostic communication. For example, the EPCU 14 may collect and transfer test information of a battery management system (BMS) according to the wireless charging, test information of battery cooling according to a control status of cooling fan for cooling the high voltage battery 12 and a battery temperature detector, test information of power distribution according to operation of a junction box, and test information of charging and discharging performance such as a battery charger activation information. The wireless charger 20 is configured as a ground assembly (GA) equipped at process line. The wireless charger 20 receives a power source from a common AC power grid, and charges the high voltage battery 12 by transferring it to the electric vehicle 10 in wireless power transfer (WPT) way The wireless charger 20 wirelessly transfers electric power for wireless charging of the high voltage battery 12 through the transmission pad 21 disposed on an inspection reference line of a bottom. For this purpose, the converter configured to rectify a power source supplied from a common AC power grid, a DC-AC inverter, a filter, and a resonant circuit may used.

At least one transmission pad 21 may be disposed to transmit electricity to the reception pad 13 through a free space as a medium using a magnetic resonance phenomenon. The centering unit 30 includes a driving roller 31 and a vision sensor 32, and aligns the position of the reception pad 13 with the vertical position of the transmission pad 21. When tires are seated on the driving roller 31, the centering unit 30 grasps an alignment status of the transmission pad 21 and the reception pad 13 by calculating a rotation center and a rotation angle of the electric vehicle 10 through a top view image photographed by the vision sensor 32 on the upper side. Hereupon, if the transmission pad 21 of the wireless charger 20 and the reception pad 13 of the electric vehicle 10 are tilted right and left, the driving roller 31 can be operated back and forth so that the vehicle can be aligned in a line on the inspection reference line.

Figure 3:
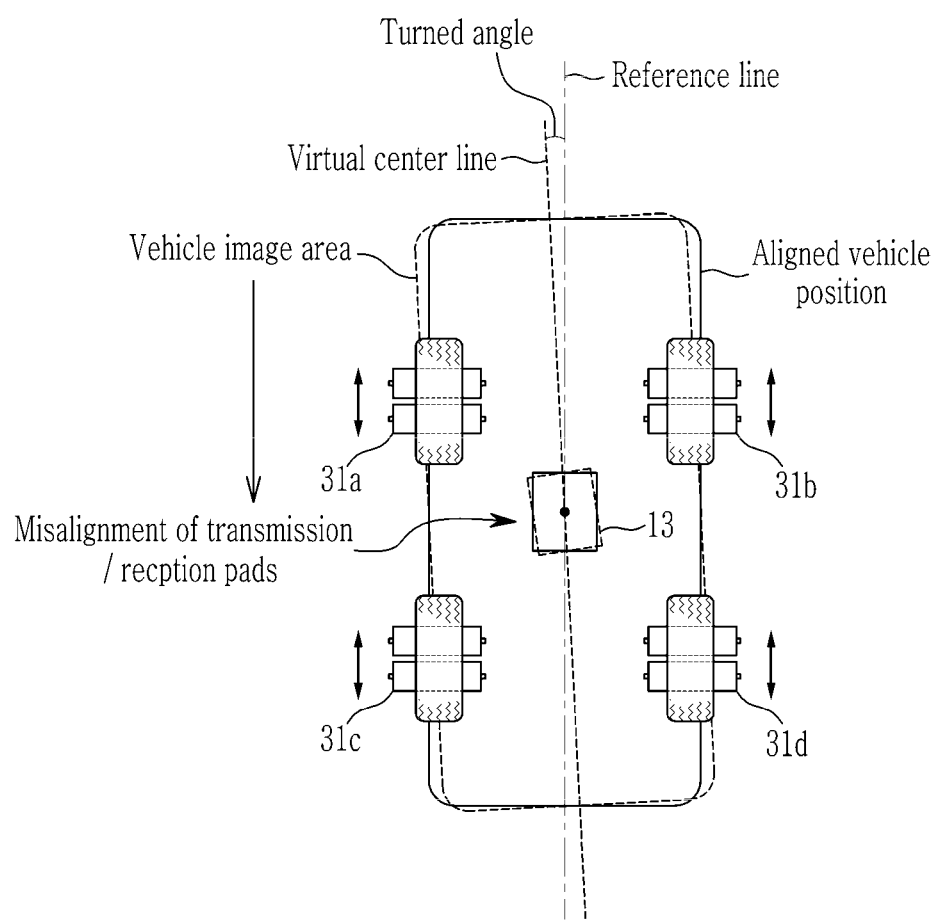
FIG. 3 illustrates a centering method according to according to an exemplary embodiment of the present disclosure.

For example, FIG. 3 illustrates a centering method according to according to an exemplary embodiment of the present disclosure. Referring to FIG. 3, the centering unit 30 calculates a tilted angle of the reception pad 13 by extracting a virtual centerline from a vehicle image area of the top view image photographed through the vision sensor 32, and comparing the virtual centerline with the inspection reference line. Here, the tilted angle of the reception pad 13 may be the same as a tilted angle of the vehicle. In addition, the centering unit 30 may operate at least one of driving rollers (31a-31d) corresponding to wheels of electric vehicle back and forth, so that the virtual centerline may be adjusted to match the reference line and the angular position of the reception pad 13 may be corrected. In usual vehicle centering, two rollers on which the tires are seated can be arranged in units of front wheels and rear wheels. In the centering unit 30 according to an exemplary embodiment of the present disclosure, four driving rollers (31a-31d) may be disposed for correcting of angular position of the reception pad 13. The position at which the receiving pad 13 is mounted on the vehicle body may be different depending on the type of the electric vehicle. In this regard, the positions of the transmission pad 21 and reception pad 13 can be mismatched even if alignment is performed through the centering unit 30. Therefore, the transmission pad alignment unit 40 is configured as an actuator, couple a rod to one surface of the transmission pad 21, and may move the position back and forth along a rail 41 in an inspection reference line direction. Such a movement control can be performed by the positional identification of the transmission pad 21 according to the change of the length of the rod, and the control of the inspector 50 according to the positional variation of the reception pad 13 according to the vehicle type information of the electric vehicle 10. That is, the transmission pad alignment unit 40 may perform position alignment of the transmission pad 21 and the reception pad 13 for optimal wireless charging by adapting to various types of vehicles, by moving the position of the transmission pad 21 according to the positional variation of the reception pad 13 according to the type of the electric vehicle 10. Here, the alignment of the positions of the transmission pad 21 and the reception pad 13 may have the same meaning as the position of the vehicle aligned with the inspection reference line. The inspector 50 connects a wireless diagnostic communication with the wireless terminal 11 of the electric vehicle 10 which entered into inspection process, and controls the position alignment of the transmission pad 21 and the reception pad 13 for wireless charging of the high voltage battery 12. The inspector 50 supplies electric power through the wireless charger 20 and controls the wireless charging of the high voltage battery 12 in a wireless power transmission manner through the transmission pad 21. Further, the inspector 50 receives the test information from the EPCU 14 from the EPCU 14 connected through the wireless diagnostic communication to determine the operating status of a battery control system (BMS), a battery cooling system, a battery charging system, and a high voltage distribution system during wireless charging of the high voltage battery 12.

Figure 4:
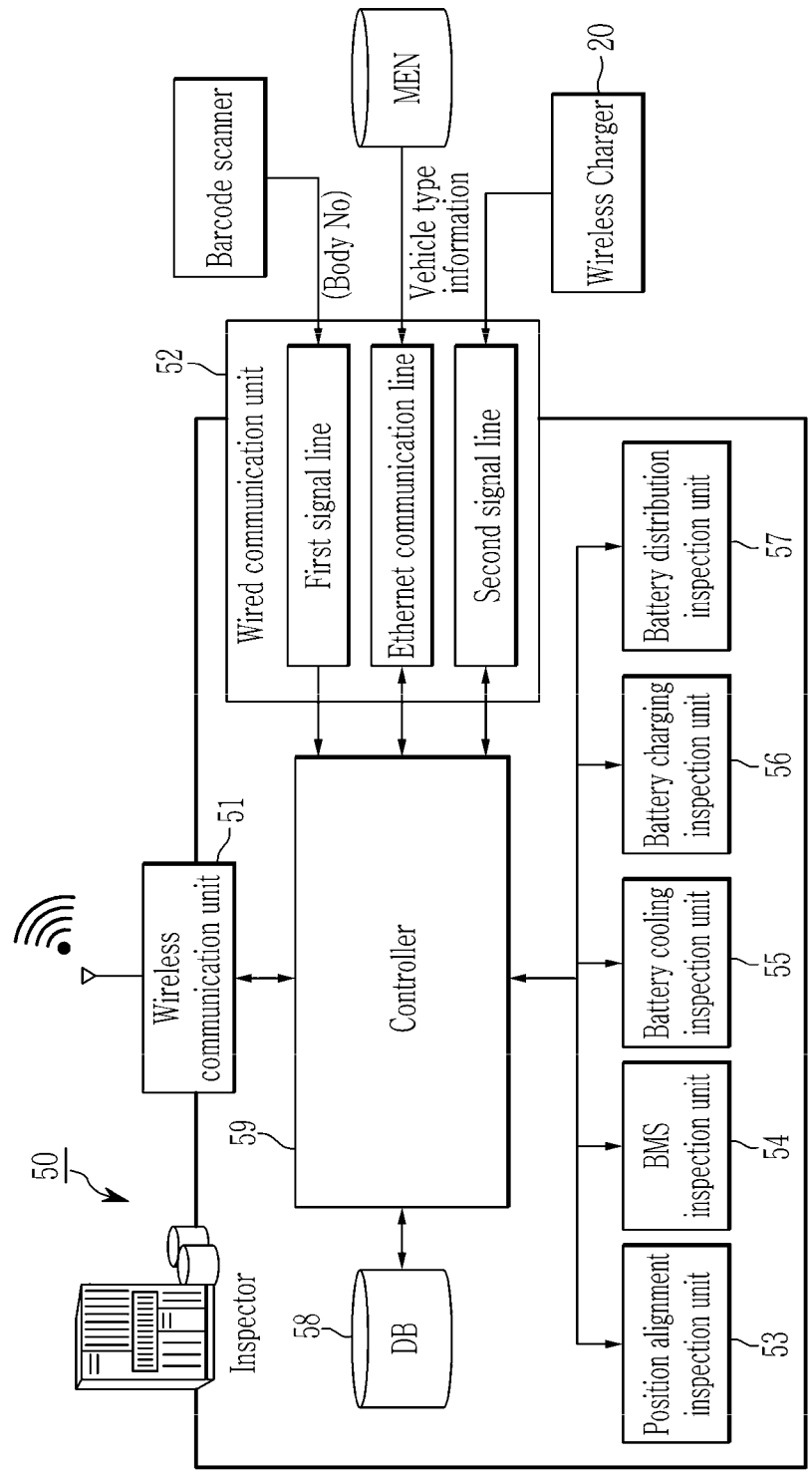
FIG. 4 is a block diagram schematically illustrating a configuration of an inspector according to an exemplary embodiment of the present disclosure.

FIG. 4 is a block diagram schematically illustrating a configuration of an inspector according to an exemplary embodiment of the present disclosure. Referring to FIG. 4, the inspector 50 according to an exemplary embodiment of the present disclosure includes a wireless communication unit 51, a wired communication unit 52, a position alignment inspection unit 53, a BMS inspection unit 54, a battery cooling inspection unit 55, a battery charging inspection unit 56, a battery distribution inspection unit 57, a database (DB) 58 and a controller 59. A wireless communication unit 51 connects a wireless diagnostic communication with the wireless terminal 11 of the electric vehicle 10 through an antenna and receives test information for inspecting the charging status of the high voltage battery 12 during wireless charging. A wired communication unit 52 is configured as a wired interface for interlocking with external device, and includes an Ethernet communication line and a plurality of signal lines. For example, a wired communication unit 52 may include an Ethernet communication line connected with a Manufacturing Execution System (MES), and a plurality of signal lines for communication with a barcode scanner, the wireless charger 20, a centering unit 30 and the transmission pad alignment unit 40.

In the present disclosure, the wireless communication unit 51 may be a hardware device capable of transmitting an analog or digital signal over the telephone, other communication wires, or wirelessly. Examples thereof include Bluetooth devices, infrared devices, Modems, a network card, smartphone, Wi-Fi devices, etc. In addition, the wireless communication unit 51 may include a communication module for wireless Internet access or a communication module for short-range communication. Here, a wireless Internet technology may include a wireless LAN (WLAN), a wireless broadband (Wibro), a Wi-Fi, a World Interoperability for Microwave Access (Wimax), and the like. Further, a short-range communication technology may include Bluetooth, ZigBee, Ultra Wideband (UWB), Radio Frequency Identification (RFID), Infrared Data Association (IrDA), and the like.

The wired communication unit 52 may be configured to perform the transmission of data over a wire-based communication technology. Examples include telephone networks, cable television or internet access, and fiber-optic communication.

When tires are seated on the driving roller 31 of the centering unit 30, a position alignment inspection unit 53 grasps an alignment status of the transmission pad 21 and the reception pad 13 by calculating a rotation center and a rotation angle of the electric vehicle 10 through a top view image photographed by the vision sensor 32 on the upper side. This is because if the efficiency of the power transmission is low due to the mismatching of the transmission pad 21 and the reception pad 13 for wireless charging, the inspection result may be influenced, and thus the position alignment inspection unit 53 determines the alignment status so that the power transmission can be efficiently performed. Hereupon, if the electric vehicle 10 is determined to be tilted to right and left on the basis of the inspection reference line, the position alignment inspection unit 53 may operate the driving roller 31 back and forth so that the vehicle can be aligned in a line on the inspection reference line. Further, the position alignment inspection unit 53 grasps position of the reception pad 13 according to the vehicle type information of the electric vehicle 10. In addition, if the current position of the transmission pad 21 is determined to be mismatched with the reception pad 13, the position alignment inspection unit 53 may operate the transmission pad alignment unit 40 to move the transmission pad 21 to a vertical position of the reception pad 13.

The BMS inspection unit 54 inspects an operation status of a BMS system based on test information received from the EPCU 14 of the electric vehicle 10 through a wireless diagnostic communication. Here, the EPCU 14 is a system configured as a BMS ECU/Power relay assembly which is an in-vehicle control module, to perform outputting state of charge (SOC) of the high voltage battery 12, diagnosing a Diagnostic Trouble Code (DTC), balancing battery cells, cooling the system, and supplying or blocking power supply. The BMS inspection unit 54 may determine whether predetermined conditions are satisfied and the BMS is operating normally, by performing a battery state of charge (SOC) inspection, a battery output inspection, a power relay inspection, a cooling inspection and a malfunction diagnostic inspection based on the test information during the wireless charging.

The battery cooling inspection unit 55 inspects an operating status of a battery cooling system based on test information received from the EPCU 14 of the electric vehicle 10 through a wireless diagnostic communication. Here, the battery cooling system comprises an in-vehicle cooling fan, a cooling duct, inlet temperature sensor, to perform cooling a high voltage battery pack assembly. The battery cooling inspection unit 55 may determine whether the battery cooling system is operating normally according to a cooling fan control performance and a temperature maintenance condition, based on battery cooling test information according to a cooling fan control status and battery temperature sensor. For example, the cooling inspection 55 may determine whether a cooling fan control performance is normal by performing a cooling fan operation test controlling a speed of the cooling fan in nine steps through the EPCU.

The battery charging inspection unit 56 activates the EPCU 14 for wireless charging of the high voltage battery 12, and determines whether the EPCU 14 is activated and whether the wireless charging of the high voltage battery 12 is being performed normally. The battery distribution inspection unit 57 may check an electric power distribution control test information of a high voltage junction box which distributes electric power of the charged high voltage battery 12 to each of in-vehicle units, and may determine whether a high voltage distribution is being performed normally.

The database 58 stores various data, programs and inspection algorithm for the wireless charging inspection of the electric vehicle 10 according to an exemplary embodiment of the present disclosure, and also stores data produced by wireless charging inspections done for each electric vehicle type. The database 58 may store information regarding a mounting position of the reception pad 13 from design information according to each type of electric vehicle, and match and store an OBD ID of the wireless terminal 11 of the electric vehicle 10 and a vehicle identification information.

The controller 59 may be configured as a central processing unit (CPU) controlling overall operations of each unit and surrounding equipment (device or system) for the wireless charging inspection of electric vehicle according to an exemplary embodiment of the present disclosure. Each unit and surrounding equipment may be configured as a form of hardware, a software, or a combination form of hardware and software. Their function and operation may be substantially controlled or interlocked by the controller 59. Hereinafter, a method for inspecting wireless charging of electric vehicle based on the aforementioned configuration of the system for inspecting wireless charging of electric vehicle according to the exemplary embodiment of the present disclosure will be described with reference to FIG. 6. In the above description, the configuration of the inspector 50 has been described in detail according to each function, but it can be integrated into one system. Therefore, in describing the method for inspecting wireless charging of electric vehicle, the subject will be described as the inspector 50.

Figure 5:
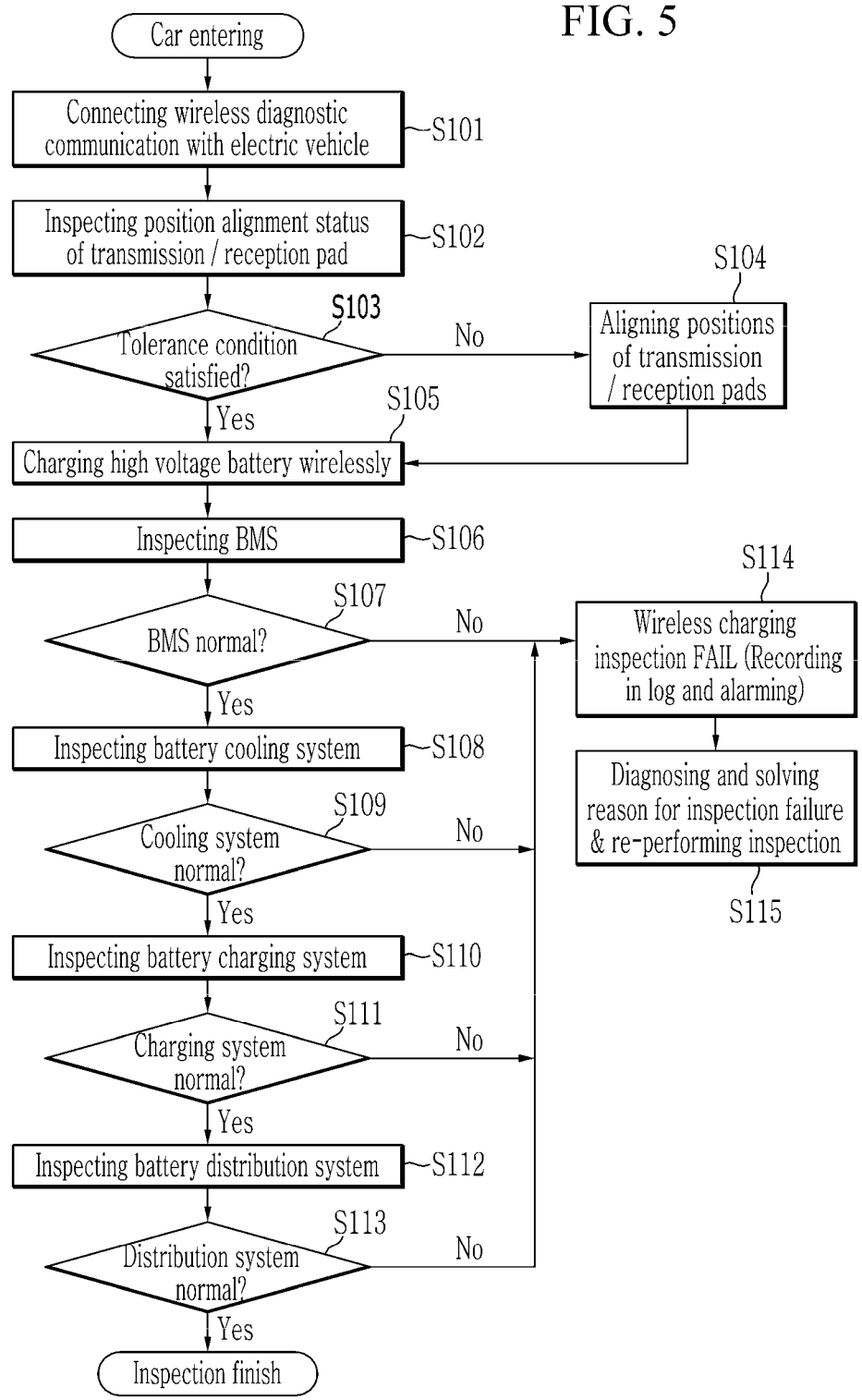
FIG. 5 is a flowchart schematically illustrating a method for inspecting wireless charging of electric vehicle according to an exemplary embodiment of the present disclosure.

Referring to FIG. 5, the inspector 50 according to an exemplary embodiment of the present disclosure recognizes entry of an electric vehicle 10 when a vehicle identification number (VIN) is input according to scanning by a barcode scanner, and then starts wireless charging inspection. The inspector 50 inquires an OBD ID of the wireless terminal 11 and a vehicle type information with the input VIN of the electric vehicle 10, and connects a wireless diagnostic communication with the EPCU 14 in the vehicle at step S101. When tires of the electric vehicle 10 are seated on the driving roller 31 of the centering unit 30, the inspector 50 grasps an alignment status of the transmission pad 21 and the reception pad 13 through a plane image photographed by a vision sensor on the upper side of the centering unit 30 at step S102. The inspector 50 detects angular difference between the transmission pad 21 of the wireless charger 20 and the reception pad 13 of the electric vehicle 10. When the angular difference does not meet a position alignment tolerance range (No in step S103), the inspector 50 performs a position alignment operation in which the driving roller 31 is operated back and forth to align the electric vehicle to make the angular difference meet the position alignment tolerance range at step S104. In this case, although not illustrated, the inspector 50 may grasp a position of the reception pad 13 according to the vehicle type information of the electric vehicle 10. If the current position of the transmission pad 21 is determined to be mismatched with the reception pad 13, the inspector 50 may operate the transmission pad alignment unit 40 to move the transmission pad 21 to a vertical position of the reception pad 13. On the other hand, if the angular difference meets the position alignment tolerance range (Yes at step S103), the inspector 50 supplies electric power to the high voltage battery 12 through the transmission pad 31 to wirelessly charge the high voltage battery 12 in a wireless power transmission manner according to operation of a wireless charger 20. At this time, the transmitted electric power is received through the reception pad 13, and is supplied to the high voltage battery 12 to charge it by the EPCU 14. The inspector 50 receives the test information from the EPCU 14 from the EPCU 14 connected through the wireless diagnostic communication to inspect whether the related systems described below are being operated normally The inspector 50 inspects an operation status of a BMS which controls overall operation of the high voltage battery 12 based on the test information received from the EPCU 14 of the electric vehicle 10 through a wireless diagnostic communication at step S106. At this time, the inspector 50 may perform a battery state of charge (SOC) inspection, a battery output inspection, a power relay inspection, a cooling inspection and a malfunction diagnostic inspection based on the test information during the wireless charging according to the operation status of the BMS. The inspector 50 determines the BMS to be operated normally if all the results of the inspections regarding BMS are determined to satisfy predetermined conditions (Yes at step S107).

Next, the inspector 50 inspects an operation status of a battery cooling system based on the test information received from the EPCU 14 at step S108. The inspector 50 determines the battery cooling system to be operated normally if the inspection result satisfies a predetermined operation condition (Yes at step S109).

Next, the inspector 50 inspects an operation status of battery charging system according to whether the EPCU 14 is activated and whether the high voltage battery is being charged normally, based on the test information received from the EPCU 14 at step S110. The inspector 50 determines the battery charging system to be operated normally if the EPCU 14 is determined to be activated and the high voltage battery is being charged normally (Yes at step S111).

Next, the inspector 50 inspects an operation status of a battery distribution system based on the test information received from the EPCU 14 at step S112. At this time, the inspector 50 checks electric power distribution control test information of the high voltage junction box, and determines the battery distribution system to be normal when a high voltage distribution is being performed normally (Yes at step S113).

In the above description, each inspection process for each system, included in from step S107 to step S113, is not limited to the aforementioned example, and if necessary, the order of processes may be changed. If the results of all the inspections included in from step S107 to step S113 are determined to be normal, the inspector 50 determines the wireless charging performance of the electric vehicle to be normal and terminates the wireless charging inspection. In the meantime, if any one of the results of all the inspections included in from step S107 to step S113 is determined to be abnormal (No in steps S107, S109, S111 or S113), the inspector 50 determines the wireless charging inspection to be failed at step S114. At this time, the inspector 50 may store an inspection failure log of the system which is determined to be abnormal into a database, and may display or alarm it to the worker.

Next, the inspector 50 may diagnose a cause of inspection failure based on the inspection failure log according to a self-diagnosis algorithm which is stored in the database, solve the cause of failure, and perform a re-inspection.

FIG. 6 illustrates a comparison of operation times of a method for inspecting wireless charging of electric vehicle according to the related art and an exemplary embodiment of the present disclosure. Referring to FIG. 6, a conventional inspection method for charging electric vehicle may include following steps: ① vehicle entering; ② worker's getting off from the vehicle & connecting charging port (15 seconds); ③ inspecting slow charging function (45 seconds); ④ separating and storing slow charging gun (4 seconds); ⑤ connecting fast charging gun to the charging port (6 seconds); ⑥ inspecting fast charging function (40 seconds for CHAdeMO type, and 56 seconds for Combo type); ⑦ separating and storing fast charging gun 6 seconds); and ⑧ the worker's riding on the vehicle and moving out (7 seconds), and the total operation time may be around 131 seconds. On the other hand, a method for inspecting wireless charging of electric vehicle according to an exemplary embodiment of the present disclosure may delete ②, ④, ⑤, ⑥, ⑦ steps from the conventional inspection method, and only include ① vehicle's entering into process (3 seconds), ③ inspecting wireless charging (45 seconds), and ⑧ vehicle's leaving the process (3 seconds), and the total operation time may be around 51 seconds.

Accordingly, a method for inspecting wireless charging of electric vehicle according to an exemplary embodiment of the present disclosure has an advantage that total time taken for overall inspection process may be reduced by, for example, around 80 seconds compared to the conventional inspection method. As described, a wireless charging inspection system according to an exemplary embodiment of the present disclosure may be built-up in a conventional process line for performing a wireless charging performance inspection automatically without worker's intervention. In this regard, work process and operation hour may be reduced, and cost may be reduced accordingly.

Further, by aligning transmission/reception pads for wireless charging of a high voltage battery according to vehicle type of the electric vehicle, the system may adapt to various types of vehicles in one process line, without building-up extra process facilities. Moreover, by establishing a systematic inspection system for high voltage battery system, which is a key component of electric vehicles, it is possible to improve the quality of electric vehicles and preemptively respond to prior production technologies. The embodiments of the present disclosure are not limited to the above-described apparatuses and/or methods, but may be implemented through a program for realizing functions corresponding to the configuration of the embodiment of the present disclosure and a recording medium on which the program is recorded.

An exemplary embodiment can be easily implemented by those skilled in the art from the description of the embodiments described above. While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A system for inspecting wireless charging of an electric vehicle configured to inspect performance of a high voltage battery of the electric vehicle, the system comprising:
   a wireless charger configured to transmit electric power for wireless charging of the high voltage battery through a transmission pad disposed on an inspection reference line of a rail;
   a centering unit configured to align a position of a reception pad on a vertical position of the transmission pad through a driving roller on which the electric vehicle is positioned; and
   an inspector configured to:
      connect a wireless diagnostic communication through a wireless terminal and an antenna of the electric vehicle,
      wirelessly charge the high voltage battery by supplying the electric power through the wireless charger, and
      integrally inspect operation status of at least one of a battery management system (BMS), a battery cooling system, a battery charging system, or a high voltage distribution system during the wireless charging of the high voltage battery by receiving test information from an electric power control unit (EPCU) of the electric vehicle connected through the wireless diagnostic communication.

2. The system of claim 1, wherein the wireless charger comprises a converter configured to:
   rectify a power source supplied from a common AC power grid, a DC-AC inverter, a filter, and a resonant circuit, and
   transmit the electric power wirelessly through the transmission pad.

3. The system of claim 1, wherein, when tires are on the driving roller, the centering unit grasps an alignment status of the transmission pad and the reception pad by calculating a rotation center and a rotation angle of the electric vehicle through a top view image photographed by a vision sensor on an upper side of the centering unit.

4. The system of claim 3, wherein, when the transmission pad and the reception pad are not aligned, the centering unit aligns the electric vehicle to the inspection reference line by moving the driving rollers back and forth.

5. The system of claim 1, further comprising a transmission pad alignment unit configured to couple a rod of an actuator to one surface of the transmission pad and move it back and forth along the rail of a direction of the inspection reference line.

6. A system of claim 1, wherein the inspector comprises:
   a wireless communication unit configured to perform the wireless diagnostic communication with the wireless terminal of the electric vehicle;
   a wired communication unit comprising an Ethernet communication line and at least one signal line for a communication with external apparatus;

a position alignment inspection unit configured to grasp an alignment status of the transmission pad and the reception pad by a plane image photographed by a vision sensor disposed on an upper side of the centering unit;

a BMS inspection unit configured to inspect the operation status of the BMS based on the test information received through the wireless diagnostic communication;

a battery cooling inspection unit configured to inspect the operation status of the battery cooling system based on the test information received through the wireless diagnostic communication;

a battery charging inspection unit configured to inspect the activation status of the EPCU and the wireless charging status of the high voltage battery based on the test information received through the wireless diagnostic communication;

a battery distribution inspection unit configured to inspect whether a high voltage distribution is normal, by checking electric power distribution control test information of a high voltage junction box;

a database configured to store various data, programs and inspecting algorithm for a wireless charging inspection; and a controller configured to control an overall operation of the each unit and the wireless inspecting system according to the inspection algorithm.

7. The system of claim 6, wherein the position alignment inspection unit grasps a position of the reception pad according to vehicle type information, and operates a transmission pad alignment unit to move the transmission pad to a vertical position of the reception pad when the transmission pad and the reception pad are not aligned.

8. The system of claim 6, wherein the BMS inspection unit is configured to determine whether predetermined conditions are satisfied and the BMS is operating normally by performing a battery state of charge (SOC) inspection, a battery output inspection, a power relay inspection, a cooling inspection, and a malfunction diagnostic inspection based on the test information during wireless charging.

9. The system of claim 6, wherein the battery cooling inspection unit is configured to determine whether the battery cooling system is operating normally according to a cooling fan control performance and a temperature maintenance condition based on battery cooling test information.

10. The system of claim 6, wherein the battery cooling inspection unit is configured to determine whether a cooling fan control performance is normal by performing an operation test controlling a speed of a cooling fan of the battery cooling system through the EPCU.

11. The system of claim 6, wherein the database is configured to:
store information regarding a mounting position of the reception pad from design information according to each type of electric vehicle, and
match and store an On-Board Diagnostics (OBD) ID of the wireless terminal of the electric vehicle and vehicle identification information.

12. The system of claim 6, wherein, when the alignment status of the transmission pad and the reception pad meets a position alignment tolerance range, the controller operates the wireless charger to wirelessly charge the high voltage battery.

13. The system of claim 6, wherein, when results of the inspections on the BMS inspection unit, the battery cooling inspection unit, the battery charging inspection unit, and the battery distribution inspection unit are determined to be normal, the controller determines a wireless charging performance of the electric vehicle to be normal and terminates the wireless charging inspection.

14. A method for inspecting wireless charging of an electric vehicle using a system configured to inspect a performance of a high voltage battery, wherein the system is located in a process line, the method comprising:
a) connecting a wireless diagnostic communication with a wireless terminal which is disposed in an electric vehicle;
b) inspecting, when tires are positioned on a driving roller of a centering unit, an alignment status of a transmission pad and a reception pad for wireless charging by a plane image photographed by a vision sensor disposed an upper side of the centering unit;
c) wirelessly charging the high voltage battery by supplying electric power when the alignment status of the transmission pad and the reception pad is normal, and receiving test information according to wireless charging from an in-vehicle electric power control unit (EPCU) which is connected through the wireless diagnostic communication; and
d) integrally inspecting operation status of at least one of a battery management system (BMS), a battery cooling system, a battery charging system, or a high voltage distribution system during wireless charging of the high voltage battery.

15. The method of claim 14, wherein step a) comprises inquiring an OBD ID of a wireless terminal and vehicle type information matched with a vehicle identification number (VIN) of the electric vehicle.

16. The method of claim 14, wherein step b) comprises:
detecting a tilted angle of the reception pad with respect to the transmission pad by calculating a rotation center and a rotation angle of the electric vehicle; and
performing, when the tilted angle does not meet a position alignment tolerance range, a position alignment operation by operating the driving roller back and forth.

17. The method of claim 15, wherein step b) comprises:
grasping a position of the reception pad according to the vehicle type information of the electric vehicle; and
operating, when a current position of the transmission pad is determined to be mismatched with the reception pad a transmission pad alignment unit to move the transmission pad to a vertical position of the reception pad.

18. The method of claim 14, wherein step d) comprises:
d-1) determining whether predetermined normal operation conditions for a battery state of charge (SOC) inspection, a battery output inspection, a power relay inspection, a cooling inspection and a malfunction diagnostic inspection based on the test information during wireless charging are satisfied based on the test information;
d-2) determining whether a predetermined normal operation condition for cooling fan control performance and a predetermined temperature maintenance condition are satisfied based on battery cooling test information;
d-3) determining whether the EPCU is activated and the wireless charging is operated normally based on the test information; and
d-4) determining whether a high voltage electric power distribution is operated normally by checking electric power distribution control test information.

19. The method of claim 18, further comprising:
determining, after step d), when results of the inspections obtained in step d-1) to step d-4) are determined to be normal, a performance of wireless charging of the electric vehicle to be normal; and terminating a wireless charging inspection.

20. The method of claim 18, wherein step d) further comprises:

determining, when any one of results of the inspections obtained in step d-1) to step d-4) are determined to be abnormal, a wireless charging inspection to be failed; and storing an inspection failure log into a database and visually or audibly outputting the failure.

* * * * *